(12) United States Patent
Yoshioka et al.

(10) Patent No.: US 9,060,387 B2
(45) Date of Patent: Jun. 16, 2015

(54) ELECTRIC HEATING CATALYST

(75) Inventors: Mamoru Yoshioka, Susono (JP); Noriaki Kumagai, Susono (JP); Naoya Takagi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 136 days.

(21) Appl. No.: 13/814,676

(22) PCT Filed: Aug. 23, 2010

(86) PCT No.: PCT/JP2010/064192
§ 371 (c)(1),
(2), (4) Date: Feb. 6, 2013

(87) PCT Pub. No.: WO2012/025979
PCT Pub. Date: Mar. 1, 2012

(65) Prior Publication Data
US 2013/0140295 A1 Jun. 6, 2013

(51) Int. Cl.
*H05B 3/06* (2006.01)
*H05B 1/00* (2006.01)
*F01N 3/20* (2006.01)
*F01N 3/00* (2006.01)
*B01D 53/88* (2006.01)

(52) U.S. Cl.
CPC *H05B 1/00* (2013.01); *F01N 3/005* (2013.01); *F01N 3/2013* (2013.01); *Y02T 10/26* (2013.01); *B01D 53/88* (2013.01); *F01N 2470/24* (2013.01)

(58) Field of Classification Search
USPC .............. 219/520; 60/288, 299, 300; 422/171, 422/174, 180, 98
See application file for complete search history.

(56) References Cited

U.S. PATENT DOCUMENTS

| | | | | |
|---|---|---|---|---|
| 5,839,276 A | * | 11/1998 | Nishizawa | ...................... 60/288 |
| 2005/0042141 A1 | * | 2/2005 | Otani et al. | ...................... 422/98 |

FOREIGN PATENT DOCUMENTS

| | | |
|---|---|---|
| JP | 05269387 A | 10/1993 |
| JP | 08210127 A | 8/1996 |
| JP | 2011220323 A | 11/2011 |

* cited by examiner

*Primary Examiner* — Shawntina Fuqua
(74) *Attorney, Agent, or Firm* — Gifford, Krass, Sprinkle, Anderson & Citkowski, P.C.

(57) ABSTRACT

An object of the invention is to control the penetration of condensed water into an insulation member or a heater element in an electric heating catalyst (EHC). The EHC according to the invention includes a heater element that generates heat by supply of electric current to heat a catalyst, a casing that houses the heater element, an insulation member provided between the heater element and the casing to provide electric insulation, and an electrode connected to the heater element through an electrode chamber, which is a space located between the inner wall surface of the casing and the outer circumferential surface of the heater element. The EHC is further provided with a bypass passage, one end of which is connected to a bottom part of the casing at a position upstream of the upstream end face of the insulation member. The bypass passage bypasses the insulation member.

4 Claims, 4 Drawing Sheets

ELECTRIC HEATING CATALYST

TECHNICAL FIELD

The present invention relates to an electric heating catalyst provided in an exhaust passage of an internal combustion engine.

BACKGROUND ART

As an exhaust gas purification catalyst provided in an exhaust passage of an internal combustion engine, there has been developed heretofore an electric heating catalyst (which will be hereinafter referred to as "EHC"), in which a catalyst is heated by a heater element that generates heat by supply of electric current.

The EHC has a heater element that generates heat by supply of electric power, a casing that houses the heater element, and an insulation member for electrical insulation provided between the heater element and the casing. For example, Patent Document 1 discloses a technique of providing a mat made of an insulating material between a carrier that generates heat by supply of electric current and a casing that houses the substrate. By using such an insulation member, short circuit between the heater element and the casing can be prevented.

PRIOR ART DOCUMENTS

Patent Documents

Patent Document 1: Japanese Patent Application Laid-Open No. 05-269387

SUMMARY OF THE INVENTION

Problems to be Solved by the Invention

In the casing of the heater element in the EHC, there is provided an electrode chamber, which is a space allowing electrodes connected to the heater element to pass through. The electrode chamber is defined by the insulation member and the heater element around.

In an exhaust pipe, condensed water is sometimes generated by the condensation of moisture in the exhaust gas on the wall of the exhaust pipe. If condensed water is generated in the exhaust pipe upstream of the EHC, the condensed water is caused to flow on the inner wall surface of the exhaust pipe by the pressure of the exhaust gas. The condensed water flowing on the inner wall surface of the exhaust pipe to reach the EHC tends to flow into the bottom part in the interior of the casing of the EHC.

The condensed water flowing into the bottom part in the interior of the casing of the EHC pools in the vicinity of the upstream end face of the insulation member in some cases. If the condensed water pools in this portion, the condensed water tends to penetrate into the insulation member. If the condensed water penetrates into the insulation member, the condensed water having penetrated through the insulation member (or vapor generated by the evaporation of the condensed water) may enter the electrode chamber. The existence of the condensed water in the electrode chamber can lead to short circuit between the electrode and the casing by the condensed water. Furthermore, in cases where vapor is generated by evaporation of the condensed water to increase the humidity in the electrode chamber, the insulation resistance between the electrode and the casing can decrease greatly.

Moreover, if the condensed water pools in the vicinity of the upstream end face of the insulation member in the bottom part in the interior of the casing of the EHC, the pooled condensed water can flow into the heater element due to vibration or other causes. If a large amount of condensed water flows into the heater element at a time, the heater element is cooled locally, whereby problems such as breakage of the heater element can occur. Moreover, if the condensed water penetrates into the heater element, the condensed water (or vapor generated by the evaporation of the condensed water) may pass through the outer wall surface of the heater element to enter the interior of the electrode chamber from the heater element.

The present invention has been made in view of the above-described problems, and an object of the present invention is to control the penetration of condensed water into the insulation member and the heater element in an EHC.

Means for Solving the Problems

In the present invention, a bypass passage through which condensed water flows while bypassing an insulation member is provided on a bottom part of a casing of an EHC.

More specifically, an electric heating catalyst (EHC) according to the present invention comprises:

a heater element that generates heat by supply of electric current, thereby heating a catalyst;

a casing that houses said heater element;

an insulation member that is provided between said heater element and said casing to support said heater element and to provide electric insulation;

an electrode that is connected to said heater element through an electrode chamber having a side wall formed by said insulation member to supply electricity to said heater element, the electrode chamber being a space located between an inner wall surface of said casing and an outer circumferential surface of said heater element; and a bypass passage, one end of which is connected to a bottom part of said casing at a position upstream of an upstream end face of said insulation member, and which is arranged to bypass said insulation member.

In the EHC according to the present invention, condensed water flowing into the bottom part in the interior of the casing flows through the bypass passage. Consequently, the condensed water is unlikely to pool in the vicinity of the upstream end face of the insulation member. Therefore, the penetration of the condensed water into the insulation member or the heater element can be controlled.

The EHC according to the present invention may further comprise a water-absorbing member with which the bypass passage is filled. Filling the bypass passage with the water-absorbing member can reduce or prevent the exhaust gas flow in the bypass passage while ensuring the flow of the condensed water in the bypass passage. Therefore, deterioration of the exhaust characteristics by the provision of the bypass passage can be prevented.

The EHC according to the present invention may further comprise a sealing member that covers an end face of said insulation member, is made of a highly-airtight insulating material more airtight than said heater element, and provides electrical insulation. In this case, while the sealing member makes it hard for the condensed water to penetrate into the insulation member, the condensed water becomes more apt to pool in the vicinity of the upstream end face of the insulation member in the bottom part in the interior of the casing. However, according to the present invention, the condensed water can be prevented from pooling in the vicinity of the upstream end face of the insulation member even in this case. Consequently, the penetration of the condensed water into the heater element can be controlled.

In the EHC according to the present invention, the insulation member may be separated into an upstream part and a downstream part in the casing. In this case, the electrode chamber is provided between the upstream part and the downstream part of the insulation member all along the outer circumference of the heater element. In this case, the bypass passage is arranged to bypass the upstream part and the downstream part of the insulation member and the electrode chamber.

Advantageous Effect of the Invention

By the present invention, the penetration of the condensed water into the mat or the heater element can be controlled.

EMBODIMENTS FOR CARRYING OUT THE INVENTION

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

Embodiment

Basic Structure of EHC

Figure 1:
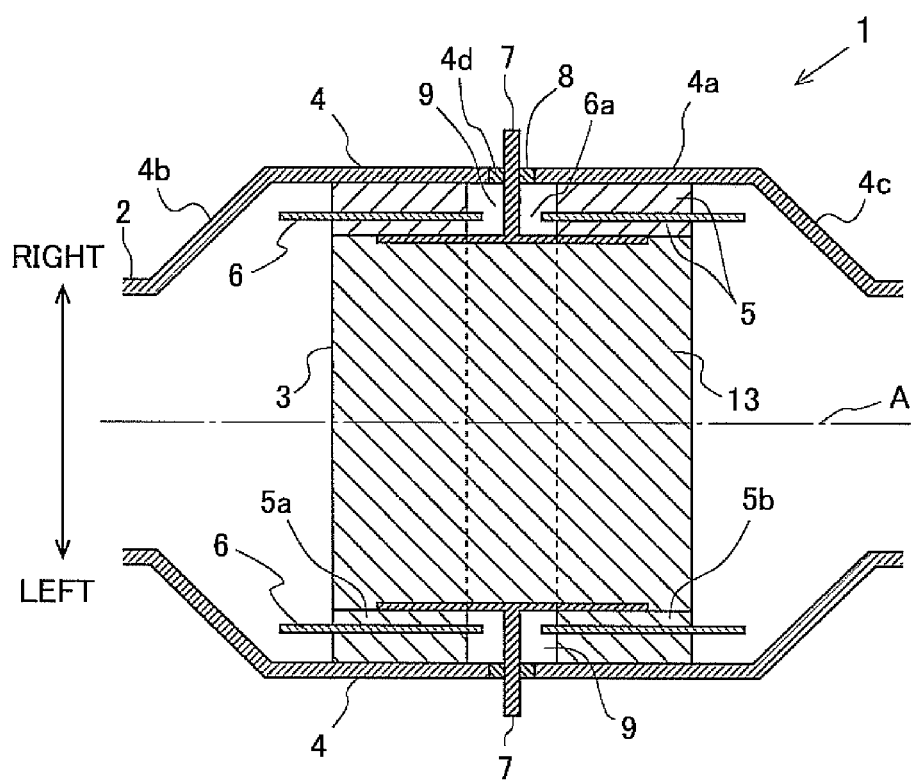
FIG. 1 is a first diagram showing the basic structure of an EHC according to an embodiment.
Figure 2:
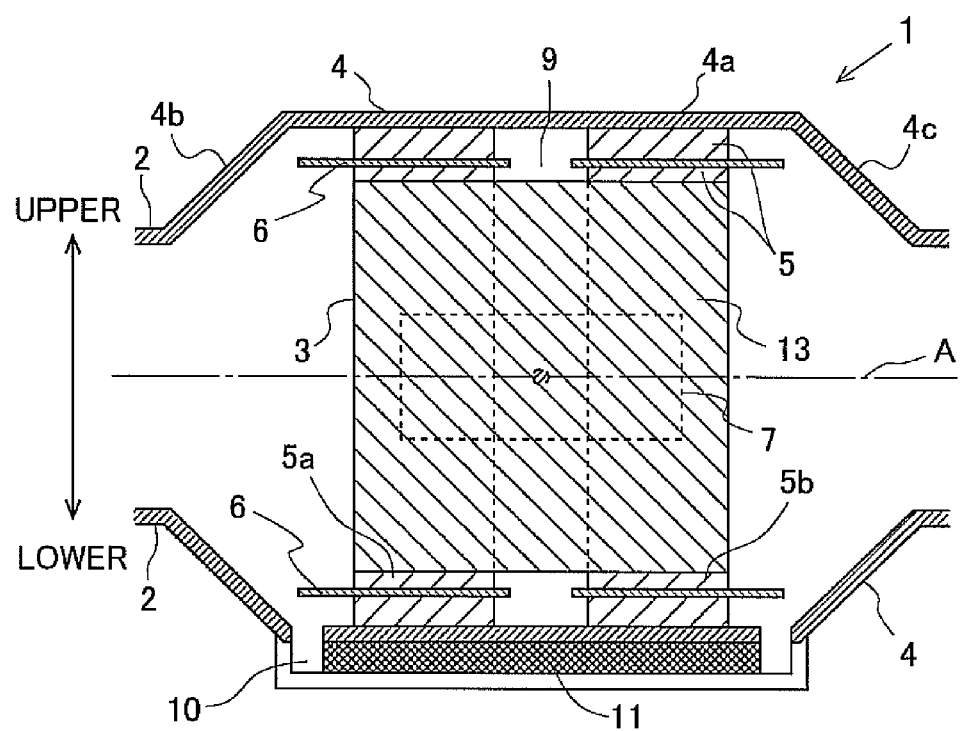
FIG. 2 is a second diagram showing the basic structure of the EHC according to the embodiment.

FIGS. 1 and 2 illustrate the basic structure of an electric heating catalyst (EHC) according to an embodiment. The EHC 1 according to the embodiment is provided in an exhaust pipe of an internal combustion engine mounted on a vehicle. The internal combustion engine may be either a diesel engine or a gasoline engine. The EHC 1 according to the embodiment can also be used in a vehicle utilizing a hybrid system equipped with an electric motor.

FIG. 1(a) is a cross sectional view of the EHC 1 taken on a horizontal cross section along the center axis A of the exhaust pipe 2 of the internal combustion engine. FIG. 1(a) is a cross sectional view of the EHC 1 taken on a vertical cross section along the center axis A of the exhaust pipe 2 of the internal combustion engine.

The EHC 1 according to the embodiment includes a catalyst carrier 3, a casing 4, a mat 5, an inner pipe 6, and electrodes 7. The catalyst carrier 3 has a cylindrical shape with its center axis arranged coaxial with the center axis A of the exhaust pipe 2. An exhaust gas purification catalyst 13 is supported on the catalyst carrier 3. The exhaust gas purification catalyst 13 may be, for example, an oxidation catalyst, an NOx storage reduction catalyst, an NOx selective reduction catalyst, or a three-way catalyst.

The catalyst carrier 3 is made of a material that behaves as an electric resistance when an electric current flows through it, to generate heat. The material of the catalyst carrier 3 may be, for example, SiC. The catalyst carrier 3 has a plurality of passages that extend along the direction of the flow of the exhaust gas (i.e. the direction along the center axis A) and have a honeycomb structure in a cross section perpendicular to the direction of the flow of the exhaust gas. The exhaust gas flows through the passages. The cross sectional shape of the catalyst carrier 3 in the direction perpendicular to the center axis A may be an elliptical or other shape. The center axis A is the common center axis of the exhaust pipe 2, the catalyst carrier 3, the inner pipe 6, and the casing 4.

The catalyst carrier 3 is housed in the casing 4. An electrode chamber 9 is formed in the casing 4. Details of the electrode chamber 9 will be described later. A pair of electrodes 7 are connected to the catalyst carrier 3 from left and right through the electrode chamber 9. Electricity is supplied to the electrodes 7 from a battery (not shown). The supply of electricity to the electrodes 7 causes an electric current to flow through the catalyst carrier 3. As the catalyst carrier 3 generates heat with the flow of the electric current, the exhaust gas purification catalyst 13 supported on the catalyst carrier 3 is heated, whereby the activity of the exhaust gas purification catalyst 13 is promoted.

The casing 4 is made of a metal. The material of the casing 4 may be, for example, a stainless steel. The casing 4 has a housing portion 4a including curved wall extending parallel to the center axis A and tapered portions 4b, 4c bridging the housing portion 4a and the exhaust pipe 2 on the upstream and downstream sides of the housing portion 4a. The cross sectional area of the passage in the housing portion 4a is larger than the cross sectional area of the passage in the exhaust pipe 2. The catalyst carrier 3, the mat 5, and the inner pipe 6 are housed in the housing portion 4a. The tapered portions 4b, 4c are tapered in such a way that the cross sectional area of the passage decreases away from the housing portion 4a.

The mat 5 is provided between the inner wall surface of the housing portion 4a of the casing and the outer circumferential surface of the catalyst carrier 3. Thus, the catalyst carrier 3 is supported by the mat 5 in the interior of the casing 4. The inner pipe 6 is held between two parts of the mat 5. In other words, the mat 5 is separated by the pipe 6 into a casing 4 side part and a catalyst carrier 3 side part.

The mat 5 is made of an electrical insulating material. The material of the mat 5 may be, for example, a ceramic fiber having alumina as the main ingredient. The mat 5 is wrapped around the outer circumferential surface of the catalyst carrier 3 and the outer circumference of the inner pipe 6. The mat 5 is separated into an upstream part 5a and a downstream part 5b with a space left between the upstream part 5a and the downstream part 5b. Because the mat 5 is provided between the catalyst carrier 3 and the casing 4, electricity is prevented from flowing into the casing 4 when the current flows through the catalyst carrier 3.

The inner pipe 6 is made of an electrical insulating material. The material of the inner pipe 6 may be, for example, alumina. The inner pipe 6 has a tubular shape about the center axis A. The length of the inner pipe 6 along the center axis A is longer than the mat 5. Thus, the upstream and downstream ends of the inner pipe 6 extend beyond the upstream and downstream ends of the mat 5 respectively.

The casing 4 and the inner pipe 6 have through holes 4d, 6a for the electrodes 7 to pass through. The space between the upstream part 5a and the downstream part 5b of the mat 5 in the casing 4 constitutes the electrode chamber 9. Thus, in this embodiment, the electrode chamber 9 is formed between the upstream part 5a and the downstream part 5b of the mat 5, all along the outer circumference of the catalyst carrier 3.

In the through hole 4d of the casing 4, there is provided a support member 8 that supports the electrode 7. The support member 8 is made of an electrical insulating material and provided between the casing 4 and the electrode 7 without a gap.

In this embodiment, a bypass passage 10 is further provided on the bottom part of the casing 4. One end of the bypass passage 10 is connected to a bottom part of the housing portion 4a of the casing 4 at a position upstream of the upstream end face of the upstream part 5a of the mat 5. The other end of the bypass passage 10 is connected to the bottom part of the housing portion 4a of the casing 4 at a position downstream of the downstream end face of the downstream part 5a of the mat 5. The bypass passage 10 is arranged in such a way as to run outside the lower circumferential wall of the housing portion 4a of the casing 4 to bypass the upstream part 5a and the downstream part 5b of the mat 5 and the electrode chamber 9.

The other end of the bypass passage 10 does not necessarily have to be connected to the housing portion 4a of the casing 4, but it may be provided at any position as long as the bypass passage 10 bypasses the mat 5. For example, the other end of the bypass passage 10 may be connected to the exhaust pipe 2 downstream of the EHC 1. The bypass passage 10 may be provided by a pipe-like member.

The bypass passage 10 is filled with a water-absorbing member 11. The water-absorbing member 11 may be made of a material the same as the material of the mat 5.

In this embodiment, the catalyst carrier 3 constitutes the heater element according to the present invention. However, the heater element according to the present invention is not limited to a carrier that supports a catalyst. For example, it may be a structure provided upstream of a catalyst. In this embodiment, the casing 4 constitutes the casing according to the present invention, and the mat 5 constitutes the insulation member according to the present invention.

[Operation and Advantageous Effect of EHC According to Embodiment]

Figure 4:
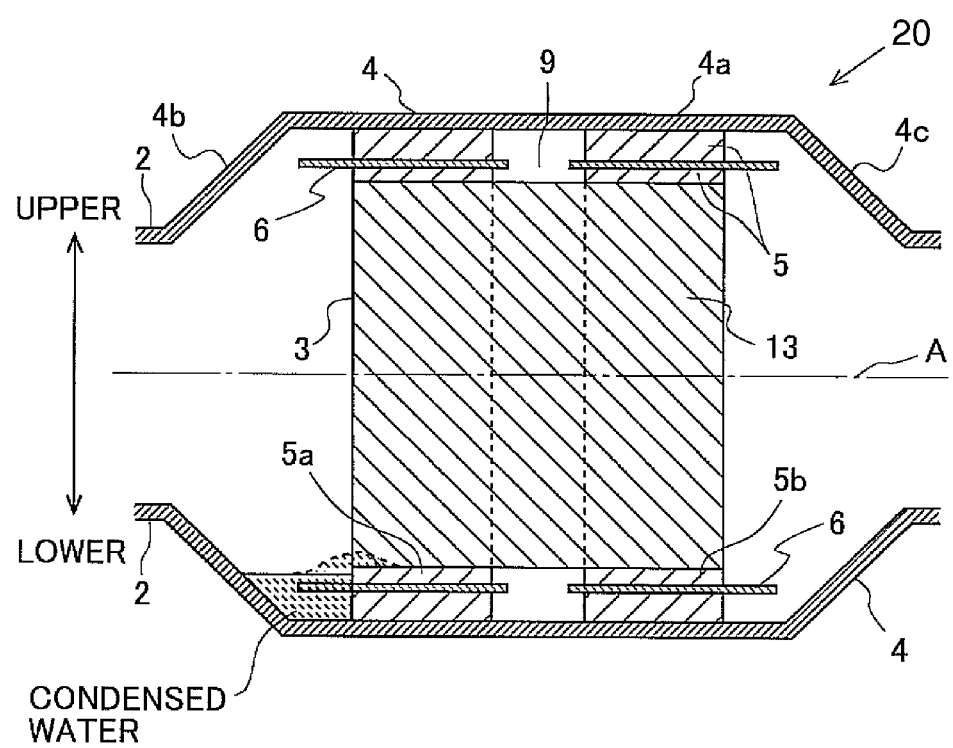
FIG. 4 is a diagram showing the basic structure of a conventional EHC.

FIG. 4 illustrates the basic structure of a conventional EHC. As shown in FIG. 4, the conventional EHC 20 does not have a bypass passage like that in the EHC 1 according to the embodiment. The construction of the EHC 20 is the same as the EHC 1 according to the embodiment except for the bypass passage.

If condensed water generated in the exhaust pipe 2 upstream of the EHC 20 reaches the EHC 20, the condensed water tends to flow into the bottom part in the interior of the casing 4 of the EHC 20. Thus, in the case of the EHC 20, the condensed water may sometimes pool in the vicinity of the upstream end face of the mat 5 in the bottom part in the interior of the casing 4.

If a pool of the condensed water is formed in this portion, the condensed water tends to penetrate into the mat 5. In some cases, the pooled water flows into the catalyst carrier 3. If the condensed water penetrates into the mat 5 or the catalyst carrier 3, the condensed water having penetrated through them or the vapor generated by the evaporation of the condensed water can enter the electrode chamber 9. The entrance of the condensed water or the vapor into the electrode chamber 9 sometimes leads to a large decrease in the insulation resistance between the electrode 7 and the casing 4 in the electrode chamber 9. If a large amount of condensed water flows into the catalyst carrier 3 at a time, the catalyst carrier 3 is cooled locally, whereby problems such as breakage of the catalyst carrier 3 can occur.

In view of the above, in this embodiment, the bypass passage 10 is provided on the bottom part of the casing 4 of the EHC 1. With the provision of the bypass passage 10, the condensed water that is generated in the exhaust pipe 2 and reaches the EHC 1 will flow into the bypass passage 10. The condensed water flowing into the bypass passage 10 will flow downstream in the bypass passage 10 while being absorbed by the water-absorbing member 11. In other words, the flow of the condensed water will bypass the mat 5 and the electrode chamber 9.

Therefore, the condensed water hardly pools in the vicinity of the upstream end face of the mat 5. In consequence, the penetration of the condensed water into the mat 5 and the catalyst carrier 3 can be controlled. Consequently, the entrance of the condensed water or its vapor into the electrode chamber can be controlled, and therefore the insulation resistance between the electrode 7 and the casing 4 can be prevented from decreasing greatly. Moreover, the condensed water can be prevented from flowing into the catalyst carrier 3 by a large amount at a time. Therefore, breakage of the catalyst carrier 3 due to local cooling of the catalyst carrier 3 can be prevented from occurring.

In the EHC 1 according to the embodiment, the water-absorbing member 11 is not an indispensable component in causing the condensed water to flow in the bypass passage 10. However, the water-absorbing member 11 provided in the bypass passage 10 can prevent or reduce the exhaust gas flow in the bypass passage 10. Therefore, deterioration of the exhaust characteristics by the provision of the bypass passage 10 can be prevented.

In the EHC according to the embodiment, the electrode chamber does not necessarily have to extends all along the outer circumference of the catalyst carrier. For example, the mat may not be separated into an upstream part and a downstream part, but a through hole may be provided partially in the mat to leave a space only in a region around each electrode. In this case, the electrode chamber is provided only in the region around the electrode. In this case also, a bypass passage like that described above provided in the EHC will cause the flow of the condensed water to bypass the mat. In consequence, the penetration of the condensed water into the mat or the catalyst carrier can be controlled.

[Modification]

Figure 3:
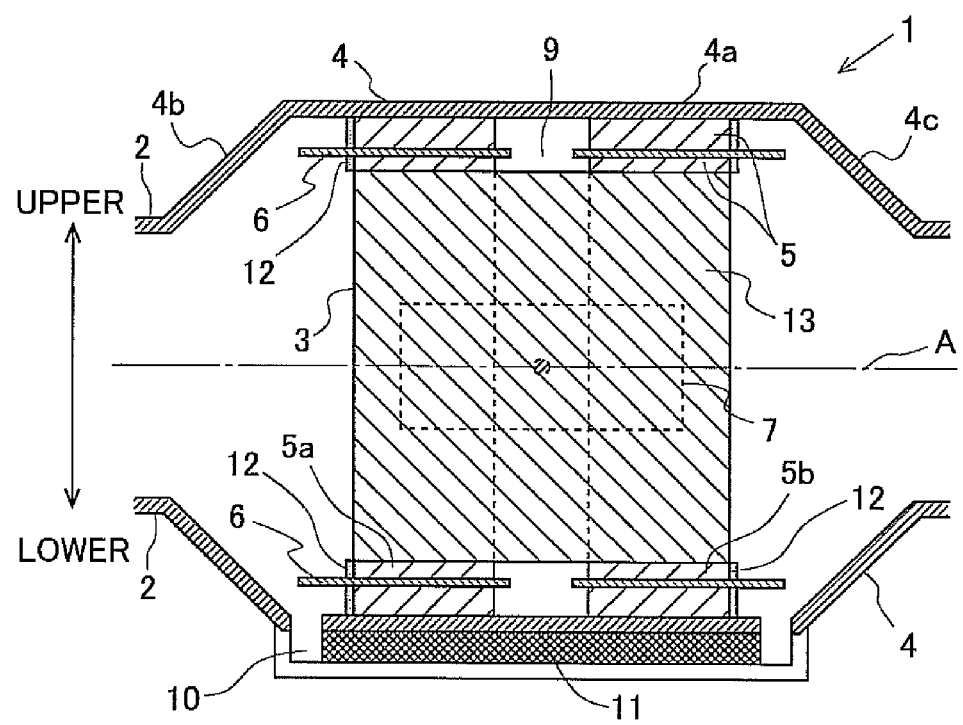
FIG. 3 is a diagram showing the basic structure of an EHC according to a modification of the embodiment.

FIG. 3 illustrates the basic structure of an EHC according to a modification of the embodiment. In this modification, the upstream and downstream end faces of the mat 5 are covered with sealing members 12. The sealing member 12 is made of a highly-airtight insulating material more airtight than the material of the catalyst carrier 3 and the material of the mat 5 and providing electrical insulation.

It is necessary for the highly-airtight insulating material constituting the sealing member 12 to have heat resistance. The highly-airtight insulating material may be, for example, a black coating material or a glass coating material. The sealing member 12 may be formed by applying a glaze, such as one used for ceramic ware or the like, on the upstream and downstream end faces of the mat 5 and calcining it.

Covering the upstream and downstream end faces of the mat 5 with the sealing member 12 having high air-tightness can prevent the condensed water from penetrating into the mat 5. However, in this case, the condensed water is hard to be absorbed by the mat 5. Therefore, without the bypass passage 10, the condensed water would be more apt to pool in the vicinity of the upstream end face of the mat 5 in the bottom part in the interior of the casing 4.

In the EHC according to the embodiment, even with the above modification, the condensed water can be prevented from pooling in the vicinity of the upstream end face of the mat 5, because the condensed water flows into the bypass passage 10. Consequently, the penetration of the condensed water into the catalyst carrier 3 can be controlled.

DESCRIPTION OF THE REFERENCE SIGNS

1: electric heating catalyst (EHC)
3: catalyst carrier
4: casing
5: mat
6: inner pipe
7: electrode
9: electrode chamber
10: bypass passage
11: water-absorbing member
12: sealing member

The invention claimed is:

1. An electric heating catalyst comprising:
 a heater element that generates heat by supply of electric current, thereby heating a catalyst;
 a casing that houses said heater element;
 an insulation member that is provided between said heater element and said casing to support said heater element and to provide electric insulation;
 an electrode that is connected to said heater element through an electrode chamber having a side wall formed by said insulation member to supply electricity to said heater element, the electrode chamber being a space located between an inner wall surface of said casing and an outer circumferential surface of said heater element;
 a bypass passage, one end of which is connected to a bottom part of said casing at a position upstream of an upstream end face of said insulation member, and which is arranged to bypass said insulation member; and
 a water-absorbing member with which said bypass passage is filled.

2. An electric heating catalyst according to claim 1, further comprising a sealing member that covers an end face of said insulation member, the sealing member being made of a highly-airtight insulating material more airtight than said heater element and said insulation member and providing electrical insulation.

3. An electric heating catalyst according to claim 1, wherein in said casing, said insulation member is separated into an upstream part and a downstream part, said electrode chamber extends between the upstream part and the downstream part of the insulation member all along the outer circumference of said heater element, and said bypass passage is arranged to bypass the upstream part and the downstream part of said insulation member and said electrode chamber.

4. An electric heating catalyst according to claim 2, wherein in said casing, said insulation member is separated into an upstream part and a downstream part, said electrode chamber extends between the upstream part and the downstream part of the insulation member all along the outer circumference of said heater element, and said bypass passage is arranged to bypass the upstream part and the downstream part of said insulation member and said electrode chamber.

* * * * *